United States Patent
Yen et al.

(10) Patent No.: US 8,634,649 B2
(45) Date of Patent: Jan. 21, 2014

(54) BACKLIT SCENE TYPE DETECTION

(75) Inventors: Jonathan Yen, San Jose, CA (US);
William C. Kress, Mission Viejo, CA (US)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 238 days.

(21) Appl. No.: 13/083,286

(22) Filed: Apr. 8, 2011
(Under 37 CFR 1.47)

(65) Prior Publication Data

US 2012/0033890 A1    Feb. 9, 2012

Related U.S. Application Data

(60) Provisional application No. 61/324,483, filed on Apr. 15, 2010.

(51) Int. Cl.
*G06K 9/00* (2006.01)
*H04N 5/74* (2006.01)

(52) U.S. Cl.
USPC ........................ 382/191; 382/172; 348/759

(58) Field of Classification Search
USPC ............... 382/191, 181, 168, 170, 172, 173, 382/218–219, 254, 305, 312, 276, 286; 348/E3.017, E3.027, 739, 744, 776, 348/759, 766; 396/104, 89, 72, 79, 80; 362/260, 257; 349/56, 61; 345/30, 55, 345/84, 87, 88; 250/208.1, 200, 206
See application file for complete search history.

(56) References Cited

U.S. PATENT DOCUMENTS

| | | | | |
|---|---|---|---|---|
| 5,940,530 A | * | 8/1999 | Fukushima et al. | 382/164 |
| 6,301,440 B1 | * | 10/2001 | Bolle et al. | 396/128 |
| 7,773,158 B2 | * | 8/2010 | Yamashita et al. | 348/678 |
| 7,880,814 B2 | * | 2/2011 | Yamashita et al. | 348/678 |
| 7,990,465 B2 | * | 8/2011 | Yamashita et al. | 348/365 |
| 8,027,536 B2 | * | 9/2011 | Yen et al. | 382/173 |
| 2005/0025356 A1 | * | 2/2005 | Fukuda | 382/167 |
| 2007/0071316 A1 | * | 3/2007 | Kubo | 382/162 |
| 2009/0067714 A1 | | 3/2009 | Yen et al. | |
| 2009/0214108 A1 | | 8/2009 | Yen et al. | |
| 2011/0026818 A1 | | 2/2011 | Yen et al. | |

* cited by examiner

*Primary Examiner* — Sheela Chawan
(74) *Attorney, Agent, or Firm* — SoCal IP Law Group LLP; Steven C. Sereboff; Jonathan Pearce

(57) ABSTRACT

Systems and methods for backlit scene detection are described. The method includes performing a pre-test on an electronic image to determine that the electronic image does not include a disqualifying characteristic. Next, the method includes performing a type test on the electronic image to determine an image type of the electronic image from a first set of predetermined backlit image types. Next the method includes performing a post test on the electronic image to determine that the image darkness density does not exceed a predetermined density. Finally, the method includes performing a second post test on the electronic image to determine that the electronic image is one of a second set of predetermined backlit image types or that the edge percentage of the electronic image exceeds a predetermined percentage.

18 Claims, 19 Drawing Sheets

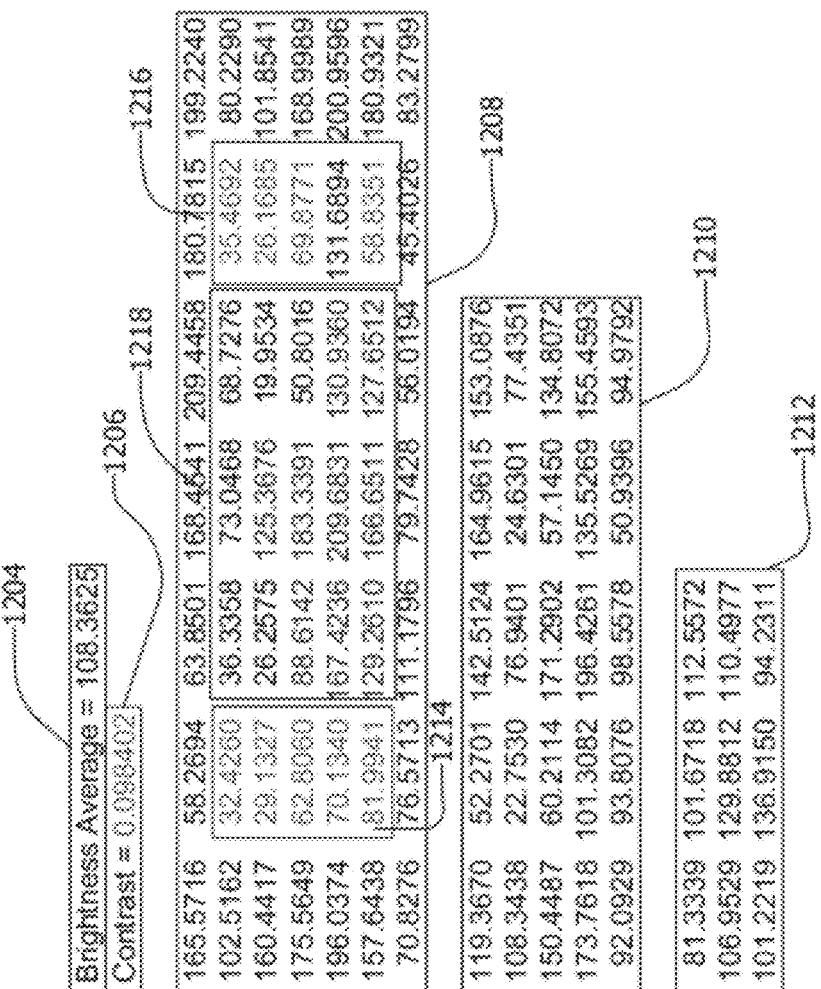
FIG. 12

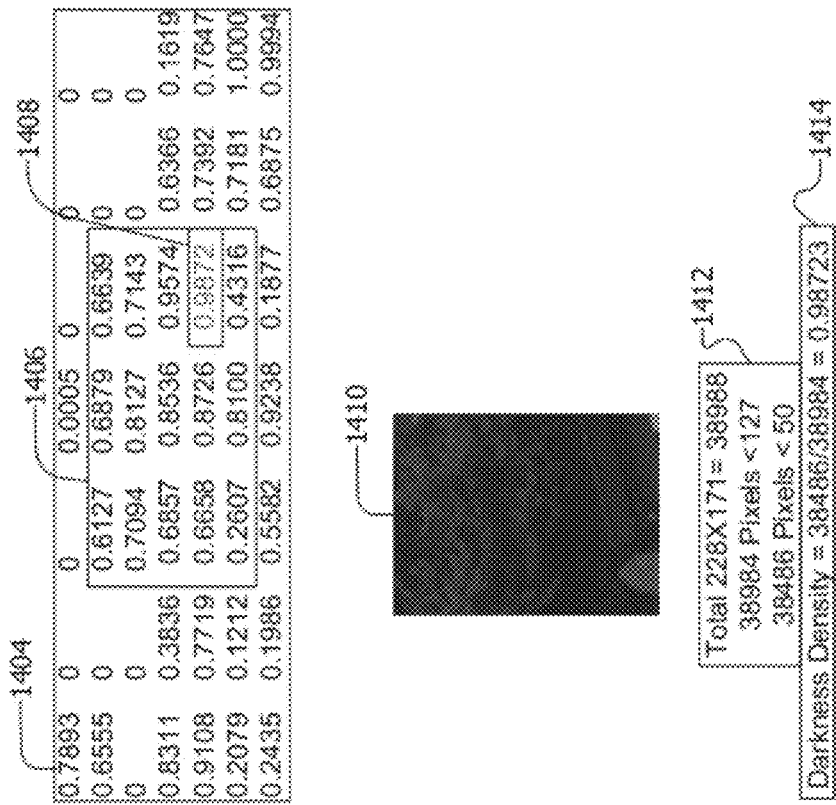
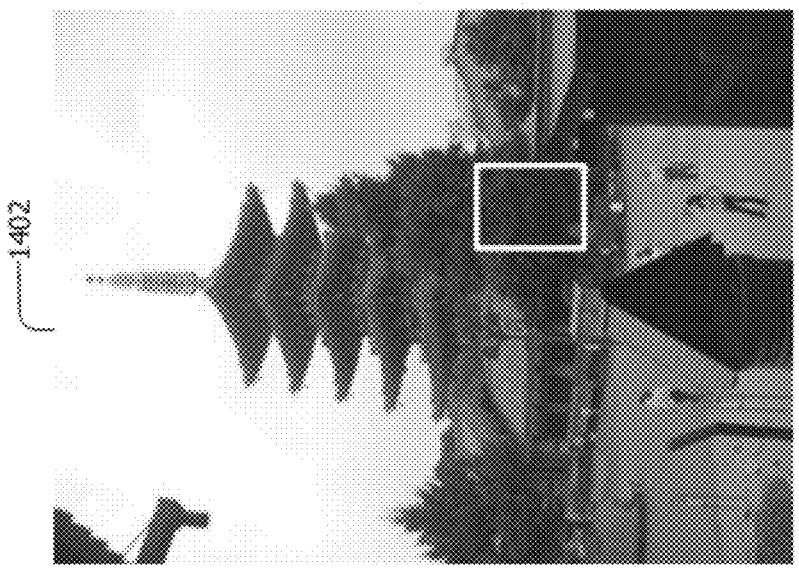
FIG. 14

BACKLIT SCENE TYPE DETECTION

RELATED APPLICATION INFORMATION

This patent application claims priority from U.S. Patent Application No. 61/324,483 entitled "Backlit Scene Type Detection" filed Apr. 15, 2010.

This patent application is related to U.S. patent application Ser. No. 12/037,711 entitled "System and Method for Isolating Near Achromatic Pixels of a Digital Image" filed Feb. 26, 2008 which is incorporated herein by reference. This patent application is related to U.S. patent application Ser. No. 11/851,160 entitled "System and Method for Image Fog Scene Detection" filed Sep. 6, 2007 which is incorporated herein by reference. This patent application is related to U.S. patent application Ser. No. 12/800,484 entitled "System and Method for Correction of Backlit Face Images" filed May 17, 2010 which is incorporated herein by reference.

BACKGROUND

1. Field

This disclosure relates to image enhancement using backlit scene detection.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

Digital or electronic images may be very easily captured and stored. As a result of the ease of creating digital images, many more images are being created. Many individuals who would previously not take photographs are now taking photographs. The resulting digital images may not be perfectly framed, lit or colored. For a number of years relatively inexpensive personal computers have been used to correct minor errors or defects in digital images using post-processing.

In the prior art, users must determine when to apply various post-processing operations. These determinations may be as simple as "eyeballing" a digital image. However, many users are unable to apply appropriate filters to correct common digital image defects because they do not even know the terms associated with the defects or available corrective measures. Some simple forms of automation are available, but in many cases result in the application of incorrect post-processing to images, thereby degrading digital image quality and frustrating users unfamiliar with the post-processing operations that are available.

DESCRIPTION OF THE DRAWINGS

FIG. 12 is a backlit image of type 7 and the associated evaluation matrices.
FIG. 14 is a backlit image and the associated evaluation matrix used to post test for darkness density.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Systems and methods for backlit scene detection are described. The method includes performing a pre-test on an electronic image to determine that the electronic image does not include a disqualifying characteristic. Next, the method includes performing a type test on the electronic image to determine an image type of the electronic image from a first set of predetermined backlit image types. Next the method includes performing a post test on the electronic image to determine that the image darkness density does not exceed a predetermined density. Finally, the method includes performing a second post test on the electronic image to determine that the electronic image is one of a second set of predetermined backlit image types or that the edge percentage of the electronic image exceeds a predetermined percentage.

Description of Apparatus

Figure 1:
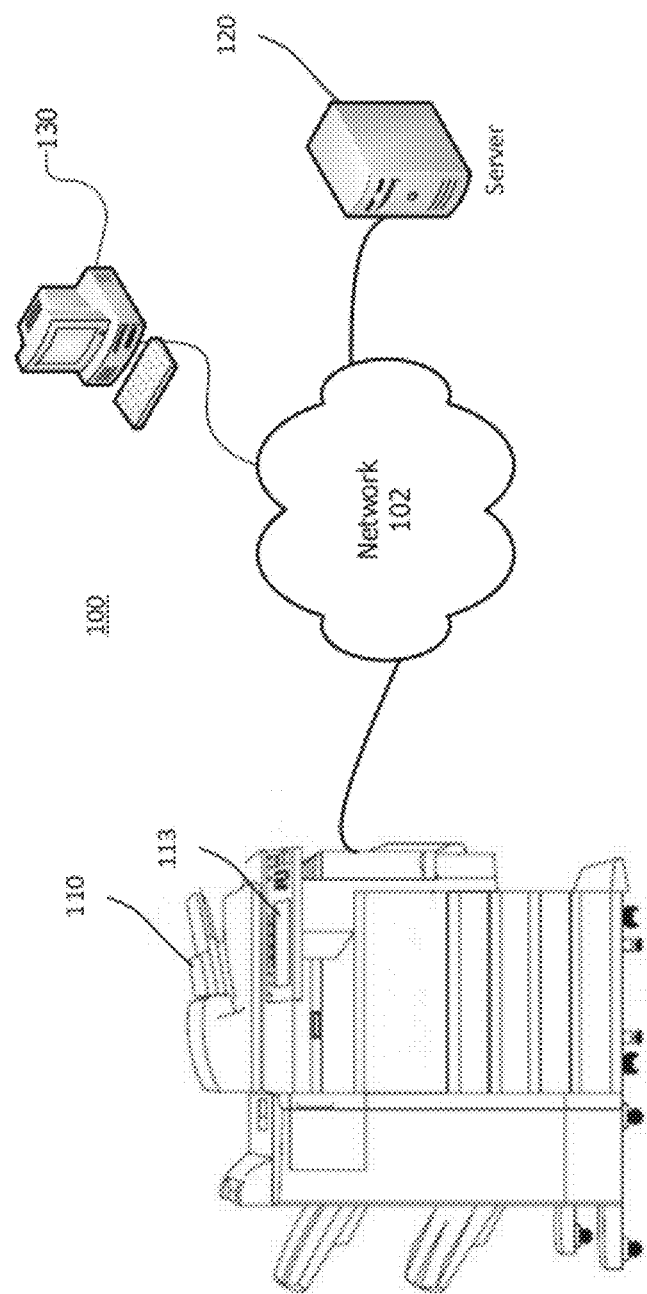
FIG. 1 is a diagram of an MFP system.

Referring now to FIG. 1 there is shown an MFP system 100. The system 100 includes an MFP 110, a server 120, and a client computer 130, all interconnected by a network 102. The system 100 may be implemented in a distributed computing environment and interconnected by the network 102.

The network 102 may be a local area network, a wide area network, a personal area network, the Internet, an intranet, or any combination of these. The network 102 may have physical layers and transport layers according to IEEE 802.11, Ethernet or other wireless or wire-based communication standards and protocols such as WiMax, Bluetooth, the public switched telephone network, a proprietary communications network, infrared, and optical.

The MFP 110 may be equipped to receive portable storage media such as USB drives. The MFP 110 includes a user interface 113 subsystem which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The server 120 is software operating on a server computer connected to the network. The client computer 130 may be a PC, thin client or other device. The client computer 130 is representative of one or more end-user devices and may be considered separate from the system 100.

Figure 2:
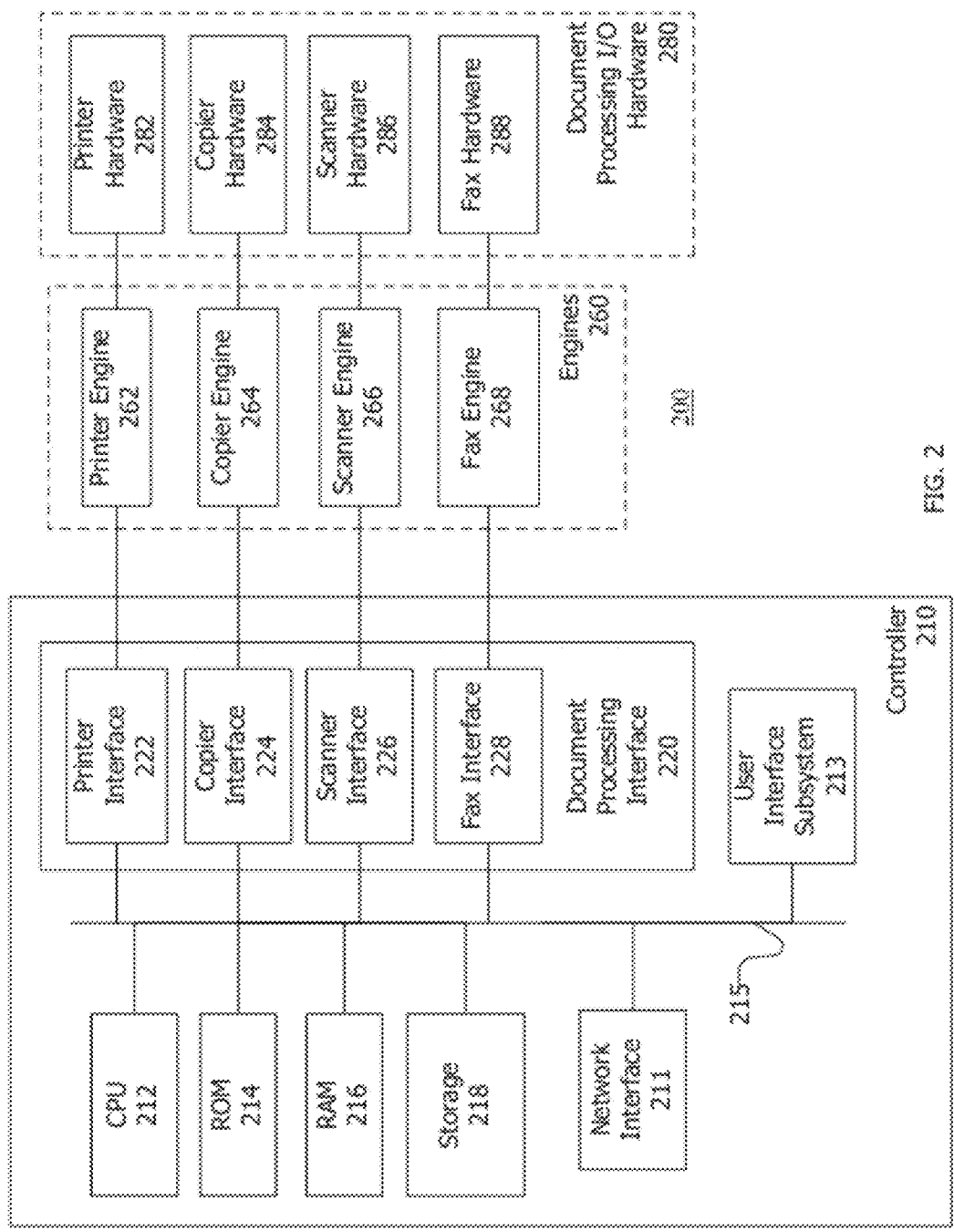
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software operating on the CPU 212 or firmware.

Each of the printer engine 262, copier engine 264, scanner engine 266 and fax engine 268 are firmware in each of the MFP hardware that interact with associated printer hardware 282, copier hardware 284, scanner hardware 286 and facsimile hardware 288, respectively, in order to complete the respective document processing functions.

Figure 3:
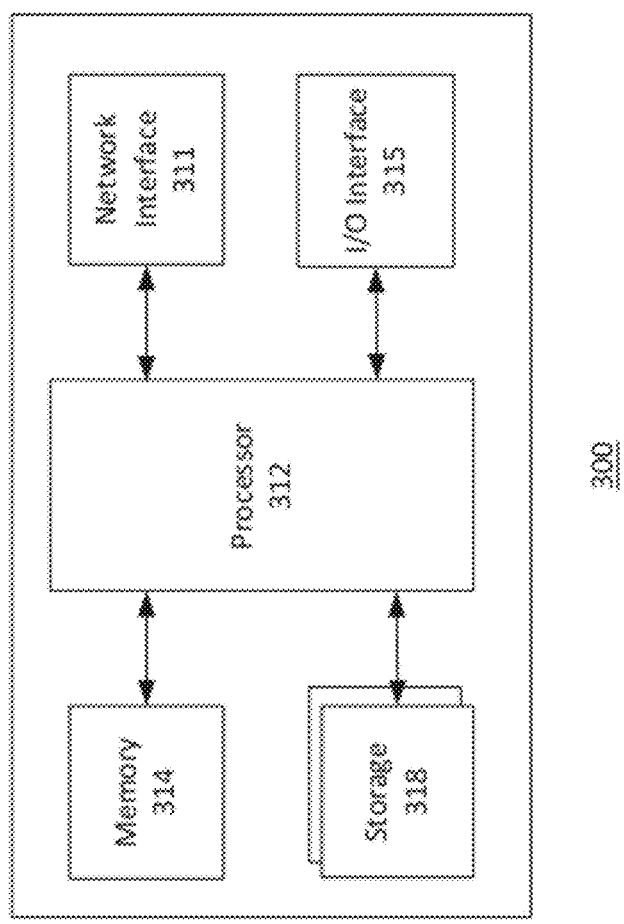
FIG. 3 is a block diagram of a computing device.

Turning now to FIG. 3 there is shown a computing device 300, which is representative of the server computers, client devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage. In this patent, a "storage medium" does not encompass transient media such as signals and waveforms that may convey, but do not store information.

The network interface 311 includes an interface to a network such as network 102 (FIG. 1).

The I/O interface 315 interfaces the processor 312 to peripherals (not shown) such as displays, keyboards and USB devices.

Figure 4:
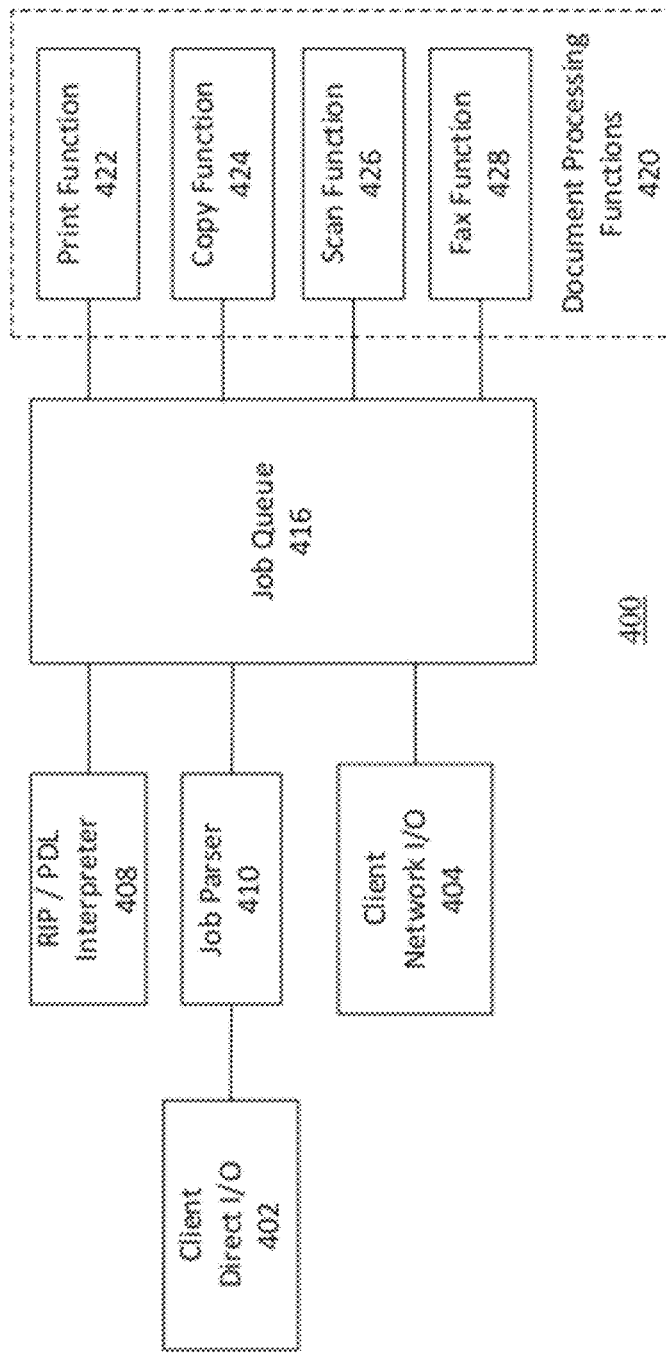
FIG. 4 is a block diagram of a software system for an MFP.

Turning now to FIG. 4 there is shown a block diagram of a software system 400 of an MFP which may operate on the controller 210 (FIG. 2). The software system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the software system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a computing device, such as a personal computer or thin client separate from the MFP. The user interface for some or all document processing functions may be provided locally by the MFP's user interface subsystem though the document processing function is executed by a computing device separate from but associated with the MFP.

The system and method described herein may be implemented as a part of software executing on a computing device external to the MFP such as computing device 300 or as a part of a software system 400 for an MFP. The software may execute at the direction of a user or may operate automatically in response to the input of a digital image. Backlit scene detection may execute automatically as an overall process of improving digital images using software on a computing device 300 or in the software system 400 of an MFP.

Figure 5:
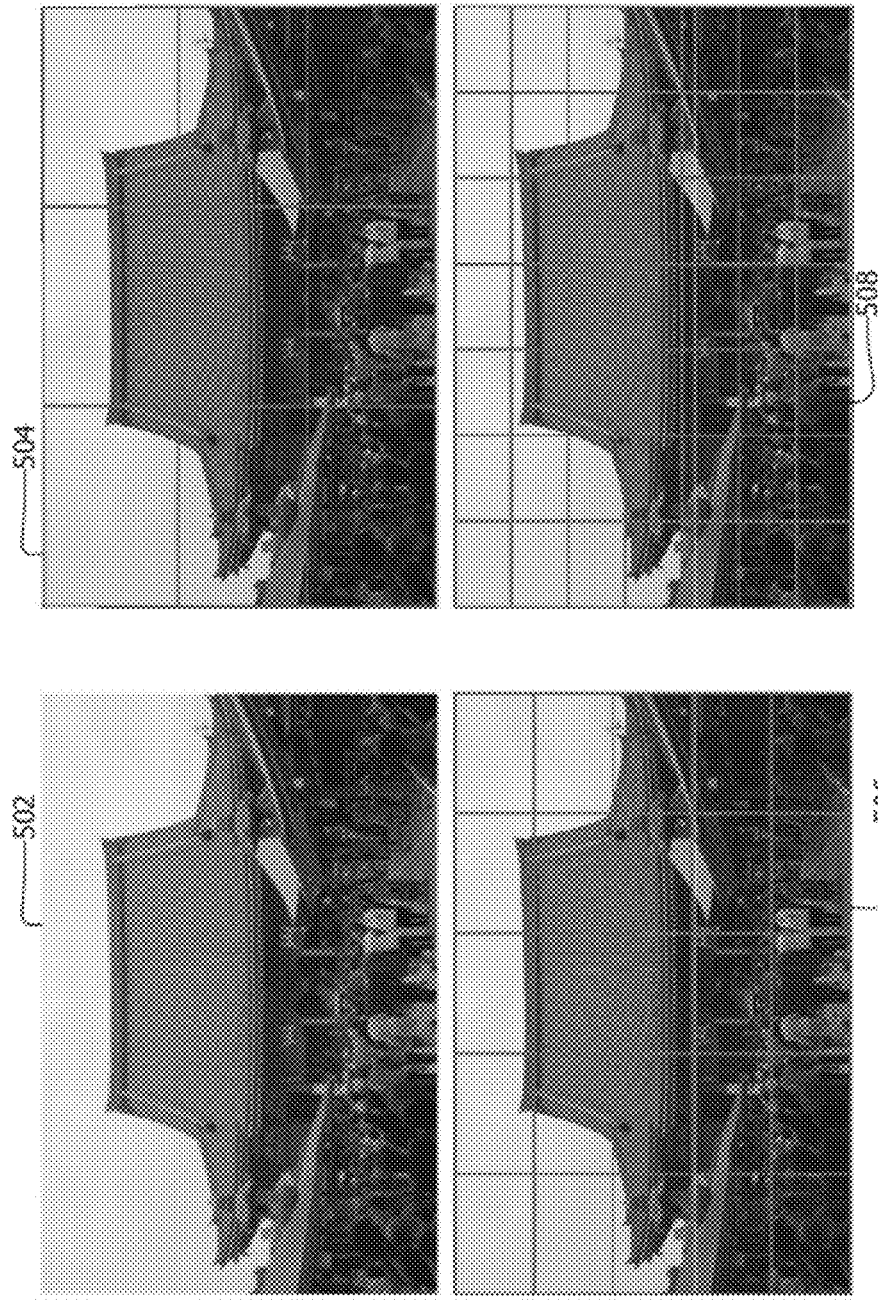
FIG. 5 is a series of images showing the way in which a digital image is divided for backlit scene detection.

Turning now to FIG. 5, a series of images showing the way in which a digital image is divided for backlit scene detection is shown. Digital image 502 is the original image, showing no divisions. Although not visible in these figures, the digital image 502 is in color. Digital image 504 is a first set of divisions, dividing the digital image 502 into a three-by-three matrix. Digital image 506 is a second set of divisions, dividing the digital image 502 into a five-by-five matrix. Digital image 508 is a third set of divisions, dividing the digital image 502 into a seven-by-seven matrix. Digital images 504, 506 and 508 images are also converted to grayscale in order to aid backlit scene detection. Grayscale images may be most easily used to detect wide contrasts in brightness in digital images.

The division of digital image 502 into these matrices enables the backlit scene detection processes of the present application to be directed to a series of individual portions of the images with increasing detail. In this way, large portions of backlit scene may be detected along with smaller portions. The remainder of the specification describes processes directed to one or more of these matrices—and in most cases all three. During the backlit scene detection processes described herein, digital images are first converted to grayscale as disclosed above with regard to digital images 504, 506 and 508.

Images suitable for backlit image correction may fall into a number of known types. Eight types of images suitable for backlit image correction are identified by the present application. Each of these types is discussed in turn with examples below.

Figure 6:
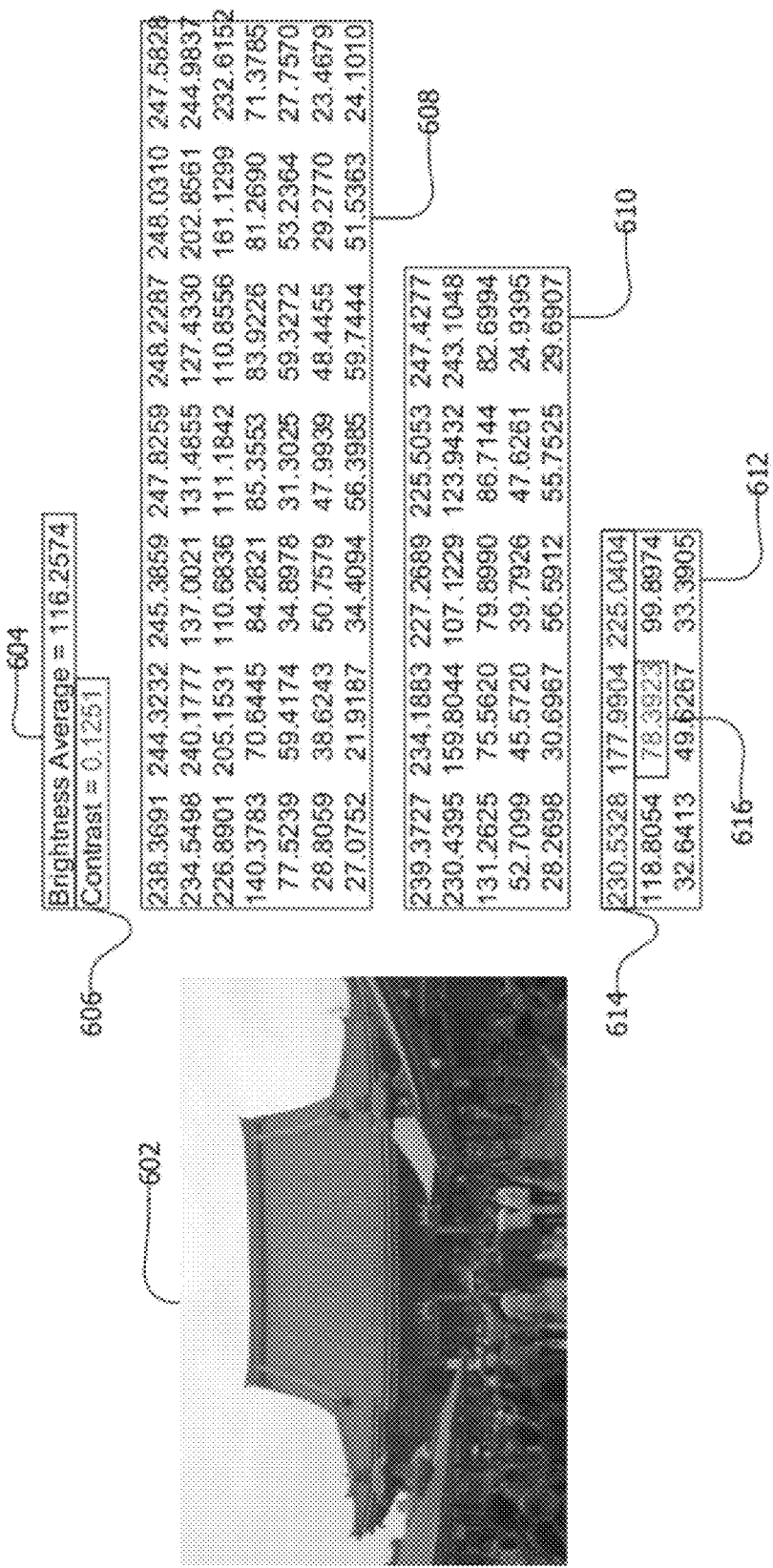
FIG. 6 is a backlit image of type 1 and the associated evaluation matrices.

Turning now to FIG. 6, a backlit image of type 1 and the associated evaluation matrices is shown. A digital image 602 is shown along with a brightness average 604, a contrast measurement 606, a seven-by-seven matrix 608, a five-by-five matrix 610, a three-by-three matrix 612, top row 614 and a central block 616.

The input image 602 is the same as image 503 (FIG. 5). Its brightness average 604, calculated as the average of each of the block luminance averages ("BLA") in each of the three matrices, is 116.2574. The BLAs are the averages of the luminance values of the pixels (for example, from 0 to 255) in each of the matrix fields.

The contrast measurement 606, defined as the variance of the standard deviation from the brightness average 604, is 0.1251. The contrast measurement 606 acts as an indicator of the range of brightness in an image, thereby indicating that an image may be suitable for backlit image correction. Contrast measurements, for example, higher than 0.075 may indicate that an image is suitable for backlit image correction.

The seven-by-seven matrix 608 includes BLAs for each of the forty-nine fields in the matrix 608. The five-by-five matrix 610 includes BLAs for each of the twenty-five fields in the matrix 610. The three-by-three matrix 612 includes BLAs for each of the nine fields of the matrix 612. The three-by-three matrix 612 includes a top row 614 of high BLAs, immediately adjacent to a central field 616 with a low BLA.

The first type, a type 1 image, is an image including a central field 616 with a low BLA, such as a BLA below 100 and including more than three fields with a high BLA, such as a BLA above 127, in the top two rows of blocks in the three-by-three matrix 612.

The central field 616 of the three-by-three matrix 612 has a BLA of 78.3923 which is lower than 100. The top row 614 has a high average BLA of over 127. Accordingly, the digital image 602 may be classified an image of type 1 suitable for backlit scene correction.

Figure 7:
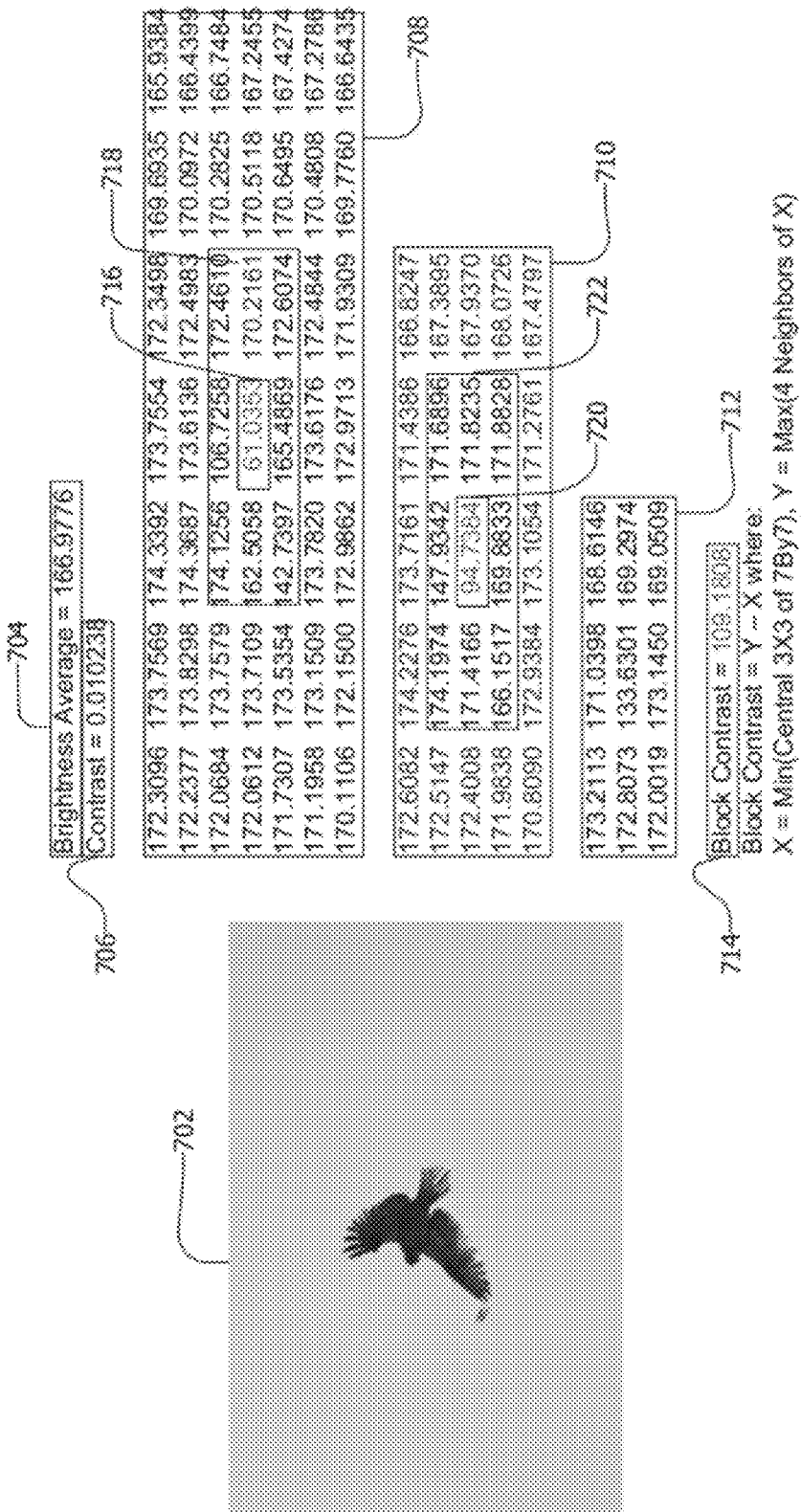
FIG. 7 is a backlit image of type 2 and the associated evaluation matrices.

Turning now to FIG. 7, a backlit image of type 2 and the associated evaluation matrices are shown. A digital image 702, a brightness average 704, a contrast measurement 706, a seven-by-seven matrix 708, a five-by-five matrix 710, a three-by-three matrix 712, a block contrast 714, a first low value field 716, a first high-value frame 718 and a second low value 720 surrounded by a second high-value frame 722 are shown.

A type 2 image is a digital image including a central block with a low BLA, such as a BLA less than 100, surrounded by a frame with high BLA, such as a BLA of greater than 127. This may be seen best in the five-by-five matrix 710 where the second low value field 720 has a value of 94.7384, but is surrounded by the second high-value frame 722 with values all over 127. This is because the bird in digital image 702 is very dark compared to the surrounding portions of the sky.

To be classified as a type 2 image, it must also be an image in which the block contrast, such as block contrast 714, of the seven-by-seven partition is high. A high block contrast is one that is greater than 85. The block contrast is defined as Y-X where X is the minimum BLA of the central three-by-three group of blocks and Y is the maximum BLA of the four neighbors of X. In FIG. 7, X is the low value center field 716 with a BLA of 61.0358. Y is the high value field 718 with a value of 170.2161. The resulting block contrast is greater than 85. Because digital image 702 satisfies the criteria to be categorized as a type 2 image, it may be suitable for backlit scene correction.

Figure 8:
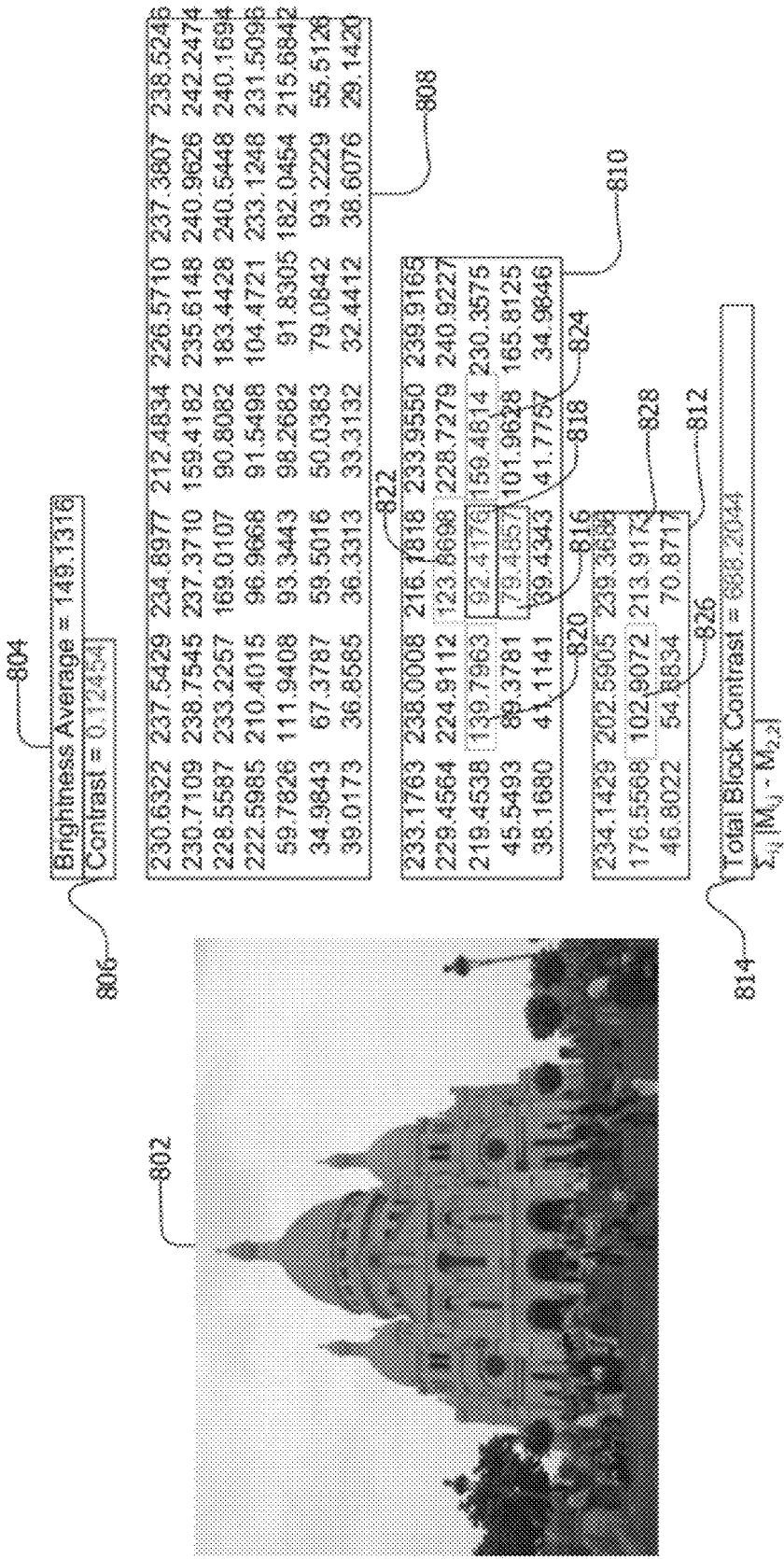
FIG. 8 is a backlit image of type 3 and the associated evaluation matrices.

Turning now to FIG. 8, a backlit image of type 3 and the associated evaluation matrices are shown. The digital image 802, the brightness average 804, the contrast measurement 806, a seven-by-seven matrix 808, the five-by-five matrix 810, a three-by-three matrix 812, a total block contrast 814, a series of cross-hair fields 816, 818, 820, 822 and 824, a central block 826 and an outer ring 828 are shown.

A type 3 image is defined as a high contrast image, for example, the contrast measurement greater than 0.075. The BLA of one of the central cross-hair fields 816, 818, 820, 822 and 824 is lower than, approximately 100 and the total block contrast is high, such as greater than 510. The total block contrast 814 is calculated as the sum of the absolute difference between the central block 826 and each of the values in the outer ring 828 of the three-by-three matrix 812. In image 802, the contrast measurement 806 is 0.12454, higher than 0.075. The cross-hair fields 816 and 818 are both lower than 100 and the total block contrast is greater than 510. When each of these elements are present, as is the case with digital image 802, then the image may be a type 3 image and may be suitable for backlit scene correction.

Figure 9:
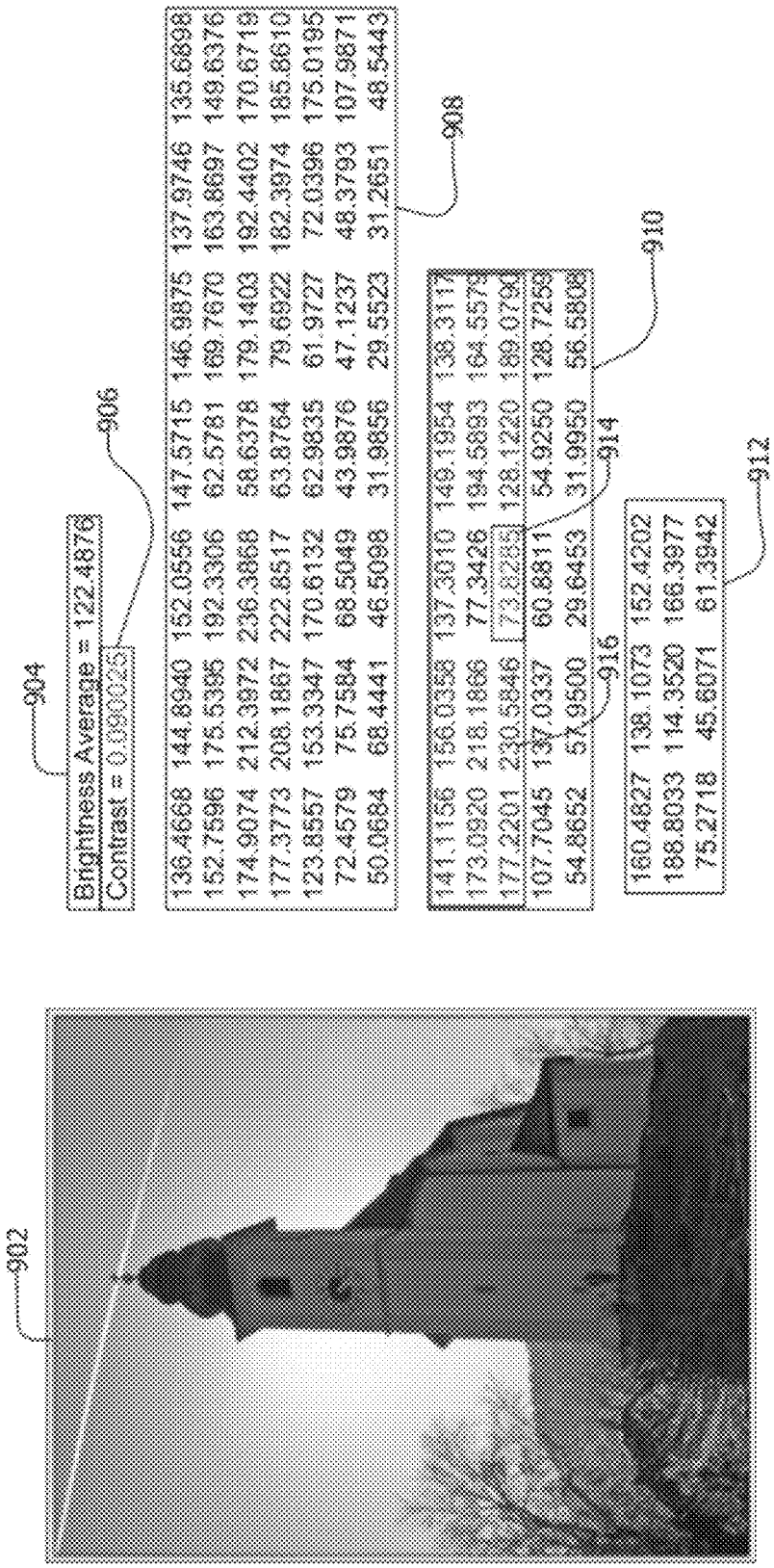
FIG. 9 is a backlit image of type 4 and the associated evaluation matrices.

Turning now to FIG. 9, a backlit image of type 4 and the associated evaluation matrices are shown. The digital image 902, the brightness average 904, the contrast measurement 906, a seven-by-seven matrix 908, the five-by-five matrix 910, a three-by-three matrix 912, a central field 914 and a group of the top-three rows 916.

A type 4 image is one in which the contrast measurement 906 is relatively high, for example, higher than 0.06 and the BLA of the central block 914 of the five-by-five matrix 910 is low, for example, lower than 100. In a type 4 image, the majority of the top three rows 916 of the five-by-five matrix 910 are also high, for example, greater than 127.

Image 902 has a contrast measurement 906 of 0.090025, the central block 914 is low at 73 and twelve of the fifteen fields in the top three rows 916 are higher than 127. An image satisfying these elements may be a backlit image of type 4 and may be subject to backlit scene correction.

Figure 10:
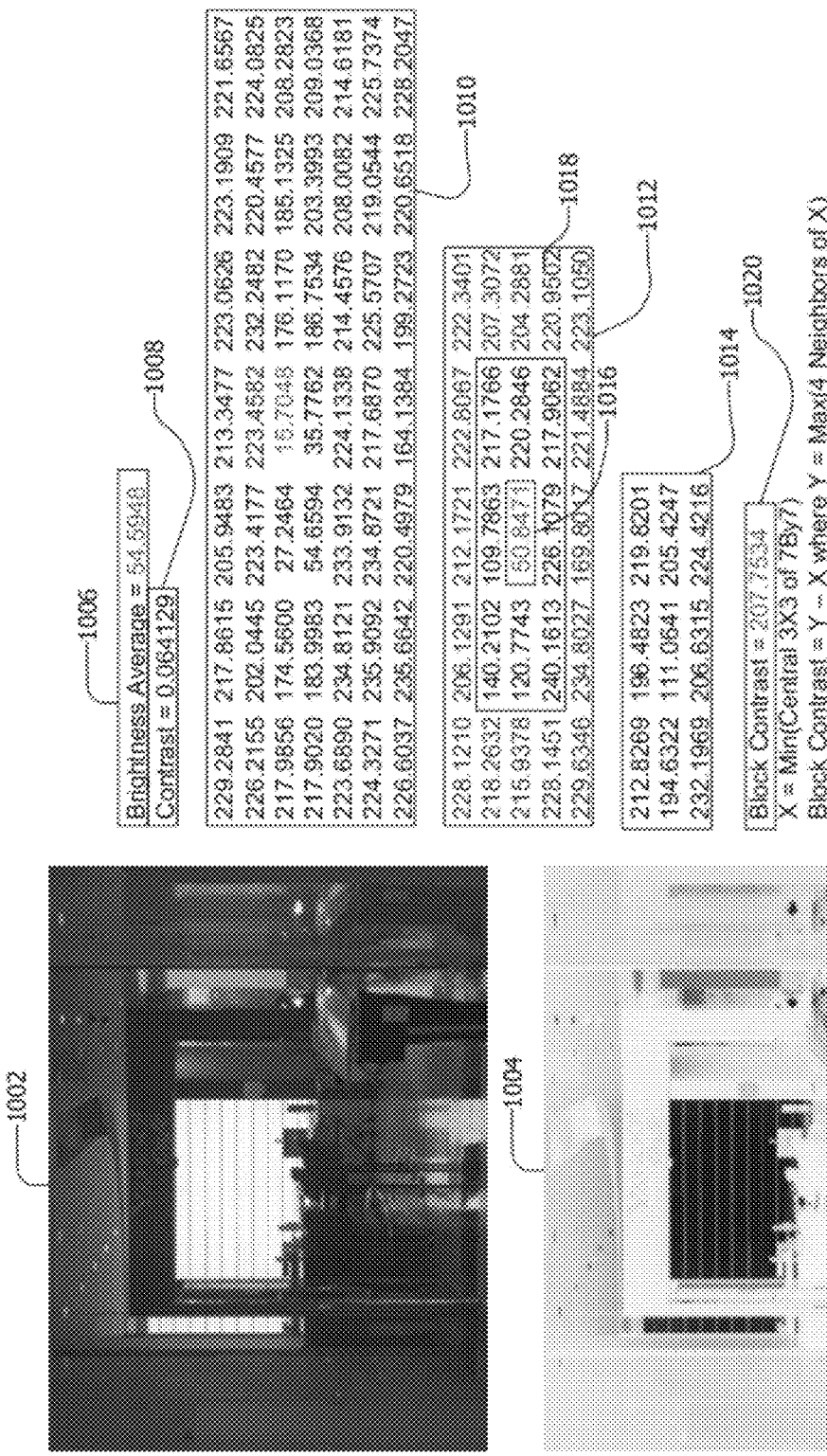
FIG. 10 is a backlit image of type 5 and the associated evaluation matrices.

Turning now to FIG. 10, a backlit image of type 5 and the associated evaluation matrices are shown. The digital image 1002, an inverted digital image 1004, the brightness average 1006, the contrast measurement 1008, a seven-by-seven matrix 1010, the five-by-five matrix 1012, a three-by-three matrix 1014, a central field 1016, an outer frame 1018 and a block contrast 1020 are shown.

An image of type 5 is first inverted from digital image 1002 to inverted digital image 1004. Next, a similar process to that for detecting a type 2 image is used on the inverted digital image 1004. Type 5 images are those in which the BLA of the central block 1016 of the five-by-five matrix 1012 is low, for example less than 100. Type 5 images also are images in which the BLA of the outer frame 1018 are high, for example greater than 127 and in which the block contrast 1020 of the seven-by-seven matrix 1010 is high, for example, greater than 85.

In the inverted digital image 1004, the central block 1016 has a low BLA of 50.8471, each of the outer frame 1018 are high, over 160 and the block contrast is high, over 200. When an image incorporates these characteristics, the image may be a backlit image of type 5 suitable for backlit scene correction.

Figure 11:
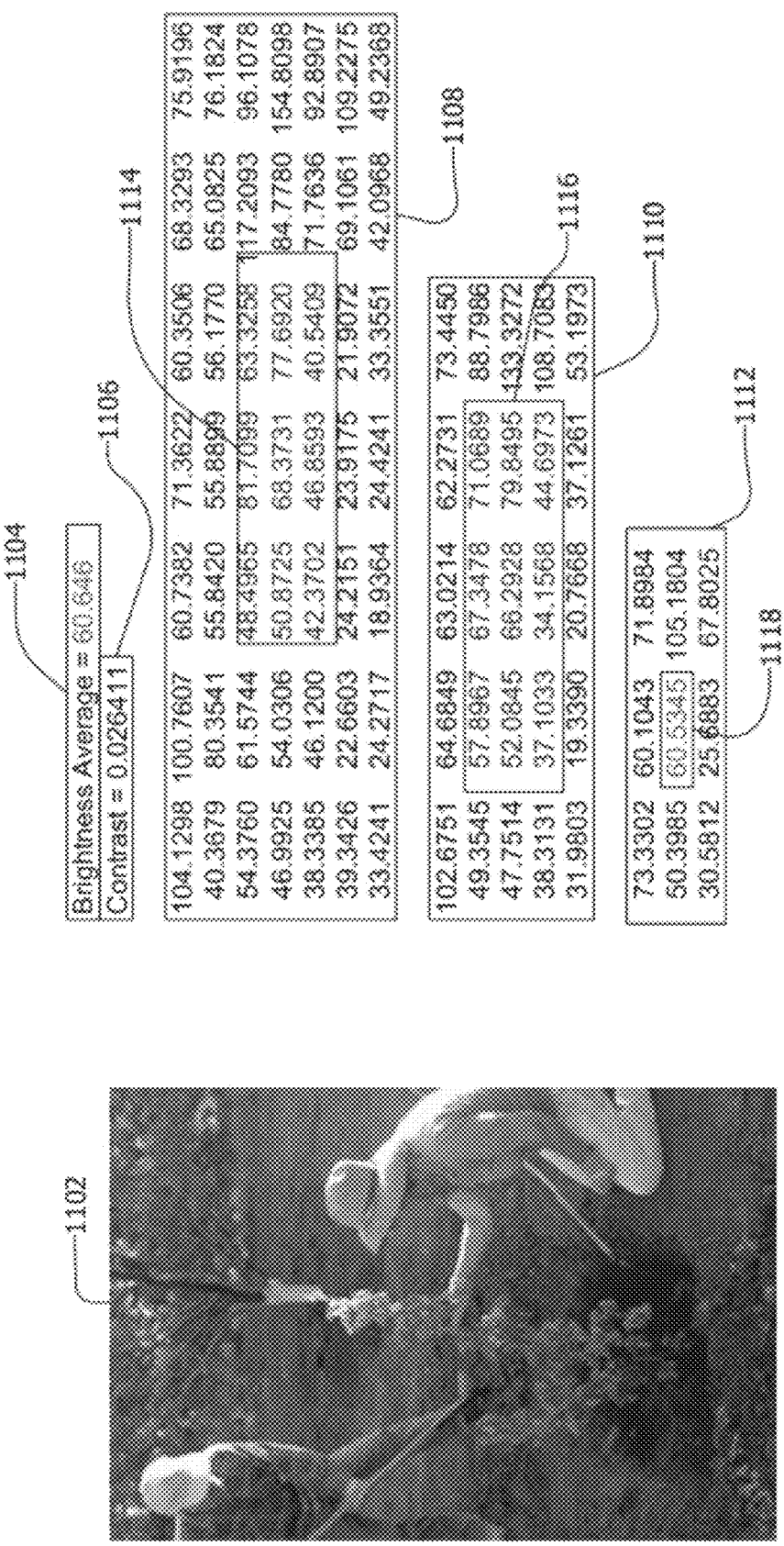
FIG. 11 is a backlit image of type 6 and the associated evaluation matrices.

Turning now to FIG. 11, a backlit image of type 6 and the associated evaluation matrices are shown. The digital image 1102, the brightness average 1104, the contrast measurement 1106, a seven-by-seven matrix 1108, the five-by-five matrix 1110, a three-by-three matrix 1112, a first set of inner blocks 1114, a second set of inner blocks 1116 and a central field 1118 are shown.

An image of type 6 is an image with a brightness average that is low, for example, lower than 85, in which the BLA of the central field 1118 of the three-by-three matrix 1112 is low, for example, lower than 85. Further, a type 6 image is one in which the majority of both the first set of inner blocks 1114 of the seven-by-seven matrix 1108 and the second set of inner blocks 1116 of the five-by-five matrix 1110 are both low, for example, lower than 85. If each of these elements are met, as in digital image 1102, then the image may be a backlit image of type 6 suitable for backlit scene correction.

Turning now to FIG. 12, a backlit image of type 7 and the associated evaluation matrices are shown. The digital image 1202, the brightness average 1204, the contrast measurement

1206, a seven-by-seven matrix 1208, the five-by-five matrix 1210, a three-by-three matrix 1212, a first set of inner blocks 1214, a second set of inner blocks 1216 and a third set of inner blocks 1218 are shown.

Type 7 images are images with two or more backlit objects. These type 7 images include a high contrast measurement 1206, for example greater than 0.07, in which the BLA of at least 9 blocks of the inner five-by-five matrix of the seven-by-seven matrix 1208 are low, for example less than 85, and in which at least five of the innermost five-by-three matrix of the seven-by-seven matrix 1208 are high, for example, greater than 85.

Digital image 1202 has a high contrast measurement 1206 of 0.098402. In addition nine of the ten fields in the first set of inner blocks 1214 and second set of inner blocks 126 are low. In addition, 9 of the 15 fields in the third set of inner blocks 1218 are high. When an image has these characteristics, it may be a backlit image of type 7 suitable for backlit scene correction.

Figure 13:
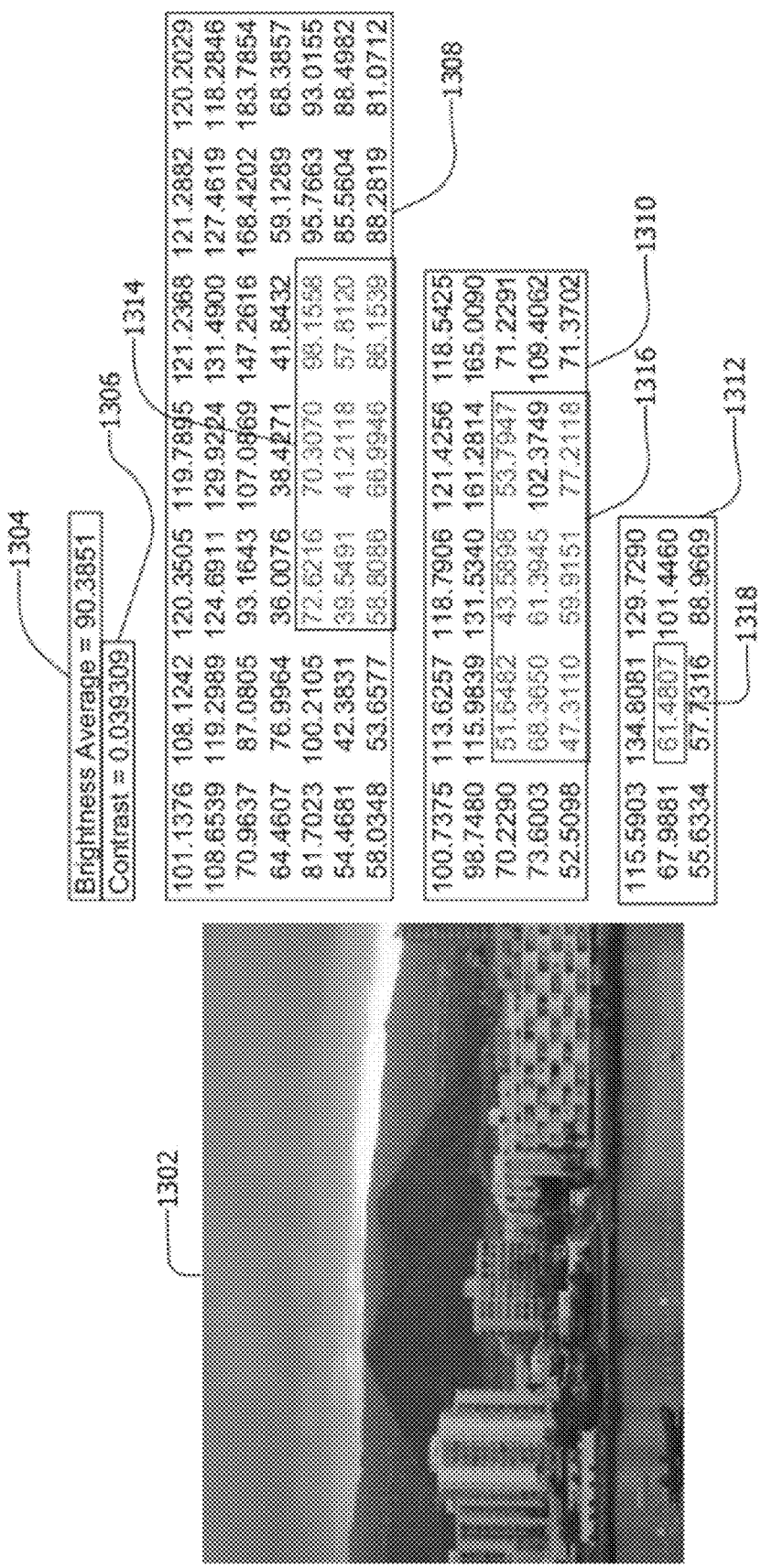
FIG. 13 is a backlit image of type 8 and the associated evaluation matrices.

Turning now to FIG. 13, a backlit image of type 8 and the associated evaluation matrices are shown. The digital image 1302, the brightness average 1304, the contrast measurement 1306, a seven-by-seven matrix 1308, the five-by-five matrix 1310, a three-by-three matrix 1312, a first set of inner fields 1314, a second set of inner fields 1316 and a central field 1318 are shown.

In images of type 8, sunset scene detection is first run. The sunset scene detection includes calculating a setting sun score, a color score, and a texture score. The sun setting score is calculated by downsizing the image to a major dimension of less than 200 pixels, converting the image to grayscale, subsampling the image such that the major dimension is equal to 20, searching for the brightest pixel in the image, cropping the image again to the brightest location (containing the brightest pixel) and examining the hue histogram of the brightest location.

The examination starts by converting to L*a*b* color space. Next, the pixels with an L* less than 95% of the maximum L* (of the cropped image) are masked. Now, if the hue concentration is less than 0.25, the sun setting score is set to=0. Otherwise, if the Imax (the height on the scaled (to 20) hue histogram at which hue peaks) is between 19 and 13, then set the sun setting score to 1, if the Imax is 12, set the sun setting score to 0.9, if the Imax is 11, set the sun setting score to 0.8, if Imax is 10, set the sun setting score to 0.7, if the Imax is 9, set the sun setting score to 0.6 and otherwise, set the sun setting score to 0.0.

The color score is calculated by downsizing the input image to a major dimension of less than 200 pixels, converting the image from RGB color space to L*a*b* space and from L*a*b* to LCH (Lightness, Chroma and Hue) space, masking off the achromatic pixels (pixels with a value, for example, less than 5) and plotting the hue histogram with normalized values between 0 and 100.

A hue sum score is then calculated as the sum(1:20)+sum (55:101) from the histogram. The Imax score is set as 1 if 2<=Imax<=14 or 59<=Imax<=75. Otherwise, the Imax score is set at 0. Then, the color score is set as (Imax score+hue sum score)/2.

Finally, the texture score is calculated by scaling the image to a major dimension of approximately 200 pixels, converting the image to grayscale, dividing the image into four quadrants and calculating the edges, for example, using the Sobel Method with a 0.05 threshold. The edge percentage is then calculated for each quadrant. The quadrant with the highest edge percentage is found and if that quadrant's edge percentage is less than 0.126, then the edge score is set to 1. If that quadrant's edge percentage is between 0.126 and 0.16, then the edge score is set to 0.75. Otherwise, the edge score is set to 0.

Next, the original image is sub-sampled to an image with a major dimension of 20 pixels and a new edge percentage is calculated. If the edge percentage of this small image is less than 0.275, then the small edge score is set to 1. If it is between 0.275 to 0.3, then the small edge score is set to 0.75. Otherwise, the small edge score is set to 0. The texture score is then calculated as (edge score+small edge score)/2.

If the brightness average is greater than 100, the setting sun score equals 1 (indicating there is almost certainly a setting sun in the image) and the color score is greater than 0.99 (indicating that the image includes many yellows and oranges), the texture score (the amount of edges is less than or equal to 0.875) and the total block contrast is greater than 100, then it is classified as a sunset scene.

Returning to FIG. 13, once the digital image 1302 is determined to be a sunset scene, using the methodology described above, the digital image 1302 is then further tested to determine if it is a type 8 backlit image. First, the BLA of the central field 1318 of the three-by-three matrix 1312 is checked to determine if it is low, for example, less than 100. Next, the BLA of the second set of inner fields 1316 of the five-by-five matrix 1310 is checked to determine if at least 8 of the nine fields have a low BLA, for example, less than 100. Finally, if the BLA of 8 of the 9 the first set of inner fields 1314 of the seven-by-seven matrix 1308 is low, for example, less than 100. If all of these conditions are met, then the image may be a backlit image of type 8, suitable for backlit scene correction.

In general, type 1, type 3 and type 4 images are typical backlit scenes including a landscape, building or structure with a background bright sky. Type 2 images are images with a dark object completely surrounded by light. Type 5 images are indoor scenes directed to a bright object, such as a window or door to the daylight outside. Type 6 images are generally poorly-lit scenes. Type 7 images are scenes including two or more dark objects against brighter backgrounds. Type 8 images are backlit sunset or dusk scenes.

Turning now to FIG. 14, a backlit image and the associated evaluation matrix used to post test for darkness density are shown. The digital image 1402, the seven-by-seven matrix 1404, the inner five-by-three matrix 1406, a high darkness density field 1408, the target portion 1410 of the digital image 1402, the darkness density calculation 1412 and the darkness density 1414 are shown.

Darkness density is calculated as one of the post tests once an image has passed the pre-tests and type tests. Darkness density is calculated for each field in the five-by-three matrix 1406 by dividing the total number of fields with BLA over 127 (in grayscale) by the total number of fields with BLA under 50 (in grayscale).

For the high darkness density field 1408, the darkness density is 38486/38984 or 0.98723. This is the field with the highest darkness density in the five-by-three matrix 1406. If this density is greater than 0.5, the image may be a backlit image suitable for backlit scene correction. In digital image 1402, this is the case.

Figure 15:
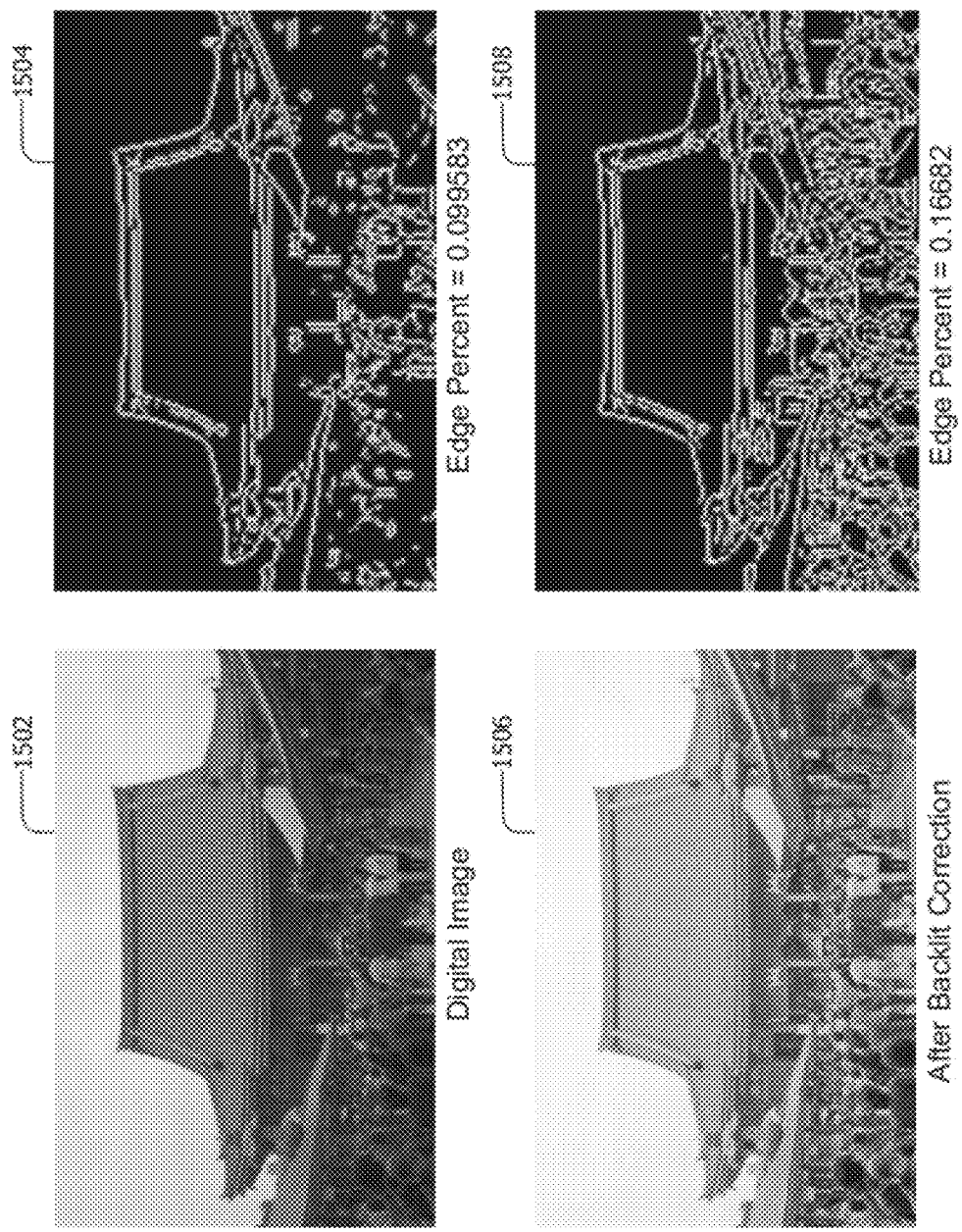
FIG. 15 is a series of images and their edge maps used as a post test.

FIG. 15 is a series of images and their edge maps used as a post test. The digital image 1502, a edge image 1504, a backlit corrected image 1506 and a backlit corrected edge image 1508 are shown.

The digital image 1504 is first downsized into a 200 pixel (or less) image. Then, a Sobel operator with a threshold value of 0.05 is applied to the digital image 1504 to create the edge image 1504. The edge image is then evaluated to determine what percentage of the edge image 1504 is "edge" (visible as white pixels). For edge image 1504, the percentage is 0.099583. If this number were less than 0.025, then this would likely not be a backlit scene. Because it is greater than 0.025, this is likely a backlit scene.

Backlit correction is applied to the digital image 1502 to create the backlit corrected image 1506. The Sobel operator with a threshold value of 0.05 is applied to the backlit corrected image 1506 to create the backlit corrected edge image 1508. The percentage of "edge" for the backlit corrected edge image 1508 is then calculated. For this backlit corrected edge image 1508, the edge percentage is 0.16682, an increase of 67.52% over the digital image 1502. In view of the great increase in "edge" in the backlit corrected image 1506, this image is almost certainly a backlit scene.

Description of Processes

The pre-tests, type tests and post tests applied as a part of the processes described below may be performed entirely on an MFP, for example, using the software system 400, or may be performed by a computing device, such as computing device 300.

In the instances in which the operations take place on the software system 400, they may automatically take place each time a document is scanned. In this way, backlit scenes may be detected and subsequently corrected automatically by the MFP without user intervention. Alternatively, the backlit scene detection enabled by the software system 400 may be initiated at a user's request, using the user interface subsystem 213. Backlit scene correction may then be applied to images categorized as suitable for backlit scene correction.

In the instances in which the operations take place on a computing device such as computing device 300, the backlit scene detection processes may operate automatically in response to an input image. These images may be input from a scanner, from a digital camera, from an email or an Internet source or simply from a file in storage associated with the computing device 300. Software embodying the process described may automatically execute in response to the input image in order to, for example, suggest that the scene may be backlit and that backlit scene correction may be available. Alternatively, the user may request backlit scene detection or correction and the processes described herein may be executed as a result of that request.

Figure 16:
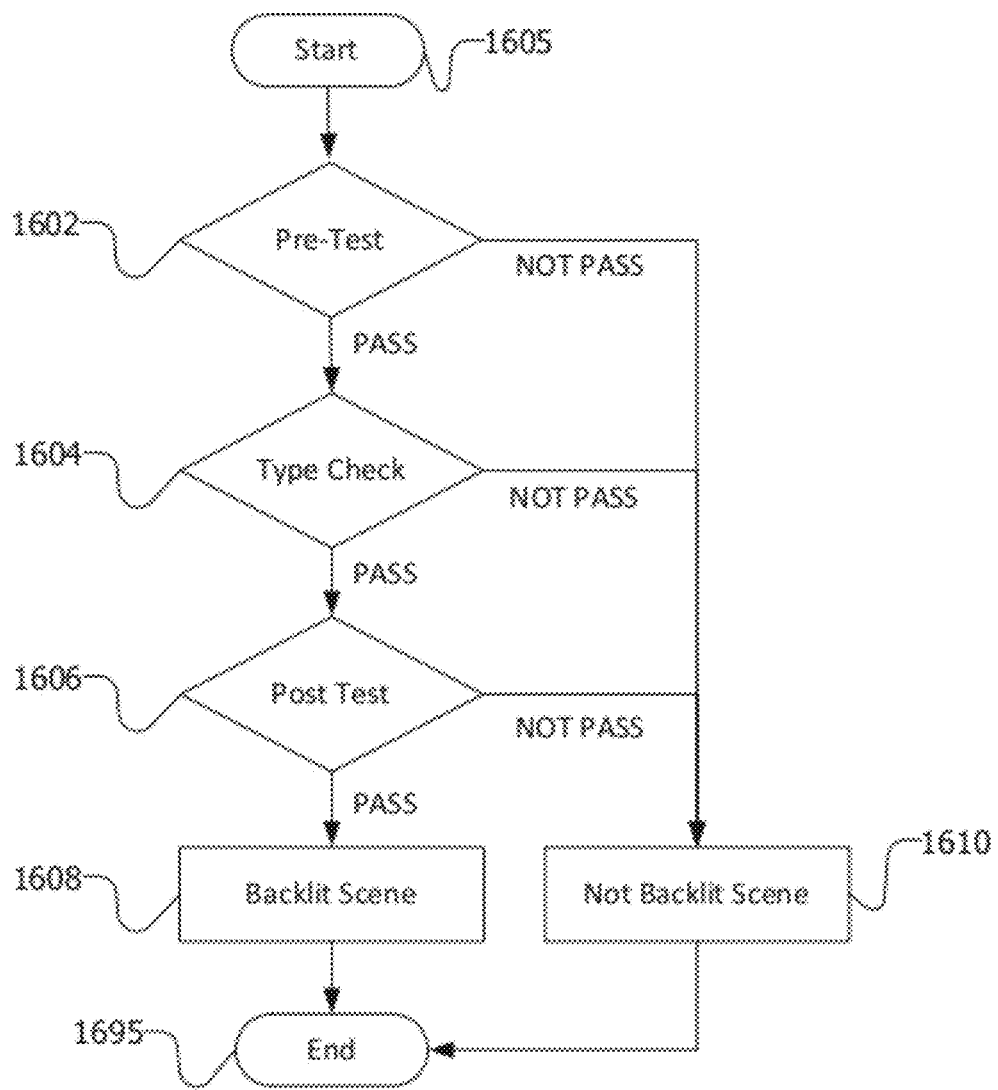
FIG. 16 is a flowchart of a backlit scene detection process.

FIG. 16 is a flowchart of a backlit scene detection process. First, the pre-tests are performed 1602. If the image passes the pre-tests, a type check is performed 1604 on the image in order to classify the image as one of the known types 1 through 8. If the image satisfies the pre-tests and the type check, a series of post tests are performed 1606 to confirm that the image is suitable for backlit scene correction.

If all three tests are passed, then the image is a backlit scene 1608 that may be suitable for backlit scene correction. If one of the tests fails, it is not a backlit scene 1610 or it is not a backlit scene of a known type and is not suitable for backlit scene correction. If it is a backlit scene 1608, then backlit scene correction may be applied either at a user's request or automatically.

The flow chart of FIG. 16 has both a start 1605 and an end 1695, but portions of the process may be accomplished in parallel or in serial. Multiple instances of the process may be taking place in parallel or in serial.

Figure 17:
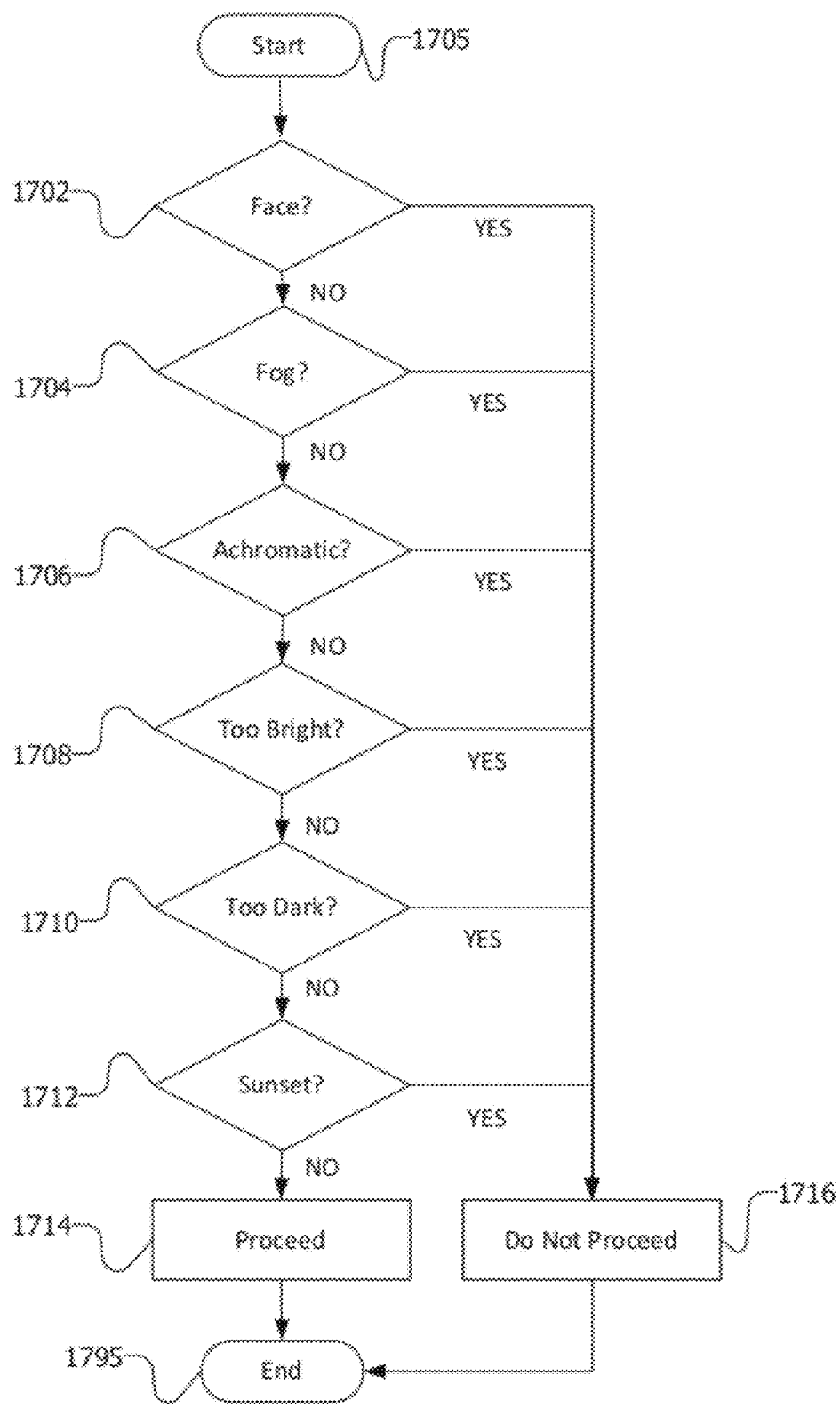
FIG. 17 is a flowchart of a pre-test portion for a backlit scene detection process.

FIG. 17 is a flowchart of a pre-test portion for a backlit scene detection process. These pre-tests are used to determine whether the image includes a disqualifying characteristic such as including a face, including fog, if the image is achromatic, if the image is too bright, the image is too dark, or if the image includes a sunset.

The first pre-test is to determine whether or not the image incorporates a human face 1702. Algorithms for face detection are disclosed in co-pending U.S. patent application Ser. No. 12/800,484 assigned to the assignee of the present application. Next, the image is tested to determine if it includes fog 1704. Algorithms for fog detection are described in co-pending U.S. patent application Ser. No. 11/851,160 assigned to the assignee of the present application.

Next, the image is tested to determine if it is achromatic 1706. Algorithms for achromatic image detection are disclosed in co-pending U.S. application Ser. No. 12/037,711 assigned to the assignee of the present application. Next, the image is tested to determine if it is too bright, for example, including an average BLA of greater than 127. The image is then tested to determine if it is too dark, for example, including an average BLA of less than 85. Finally, it is tested to determine if it is a sunset scene 1712 as described above.

If the results of any of these pre-tests is yes, then the image is not suitable for backlit scene correction and the algorithm is told not to proceed 1716. A different set of algorithms, other than backlit scene correction, may be applied to these images, dependent upon the results of these pre-tests. If the result for each of these pre-tests is negative, then the algorithm will be directed to proceed 1714 to the next phase, determining the type of the image.

The flow chart of FIG. 17 has both a start 1705 and an end 1795, but the portions of the process may be accomplished in parallel or in serial. Multiple instances of the process may be taking place in parallel or in serial.

Figure 18:
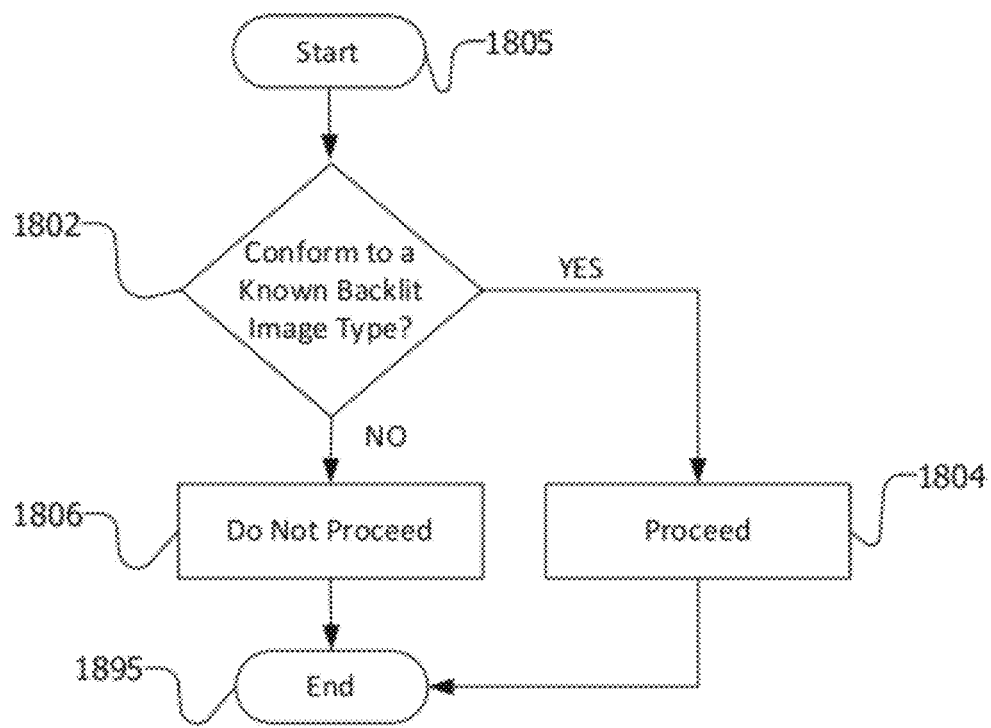
FIG. 18 is a flowchart of a type test portion of a backlit scene detection process.

FIG. 18 is a flowchart of a type test portion of a backlit scene detection process. The first step is to determine whether the input digital image conforms to one of the known backlit image types 1802. In this part of the process, the image will be tested to confirm that it is one of the known types of backlit images types 1 through 8. Upon a positive determination that the image is of one of the known types, the algorithm will proceed 1804. Upon a determination that it does not conform to one of the known types, the algorithm will not proceed 1806. A determination that an image is of a known type may prompt the process of type testing to immediately cease and cause the process to proceed to post tests. Alternatively, the digital image may be tested a total of 8 times before the algorithm proceeds to post tests.

The flow chart of FIG. 18 has both a start 1805 and an end 1895, but the portions of the process may be accomplished in parallel or in serial. Multiple instances of the process may be taking place in parallel or in serial.

Figure 19:
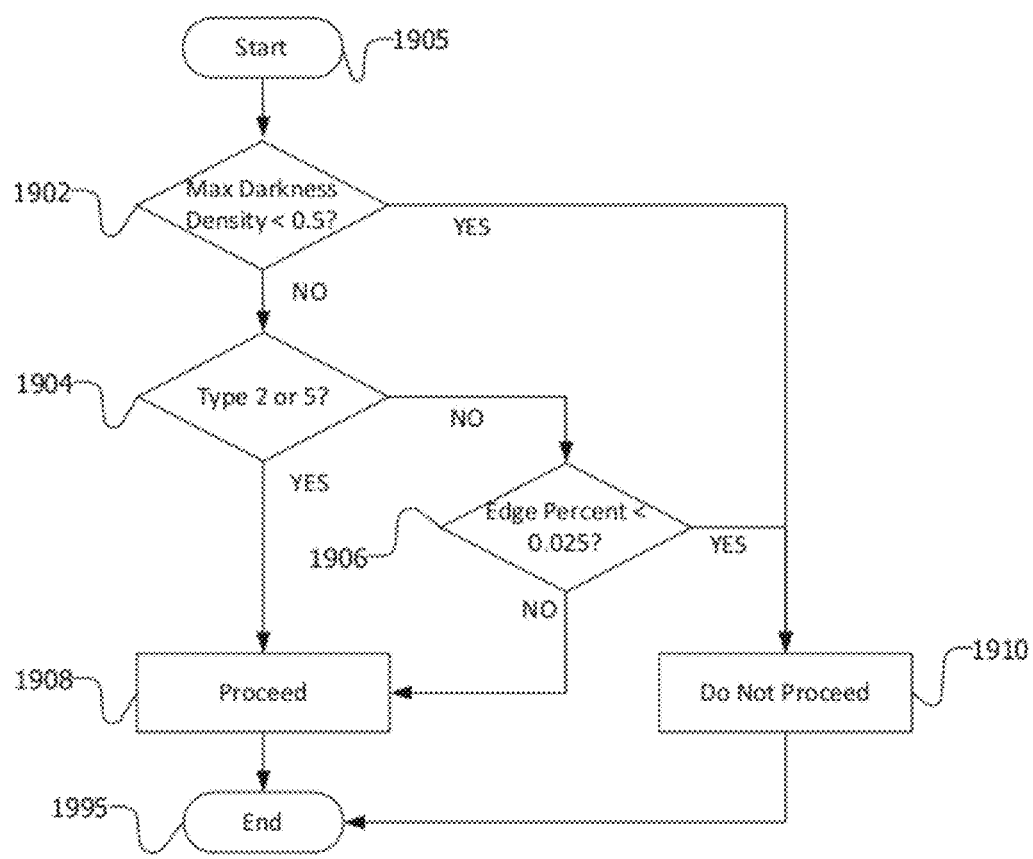
FIG. 19 is a flowchart of a post-test portion of a backlit scene detection process.

FIG. 19 is a flowchart of a post test portion of a backlit scene detection process. The first part of the post test process is to determine whether the darkness density is less than a predetermined value 1902, such as 0.5. If yes, then do not proceed 1910. Next, determine if the image is type 2 or type 5 1904. If the image is not type 2 or type 5, then confirm that the edge percentage is greater than 0.025. If so, then do not proceed 1910. If the edge percentage is less than 0.025, then proceed 1908.

As shown in FIG. 16, if the results of the pre-testing, type test and post-test are positive, then the image is a backlit image of a known type suitable for backlit scene correction. The backlit scene correction may, then, be applied to the image. If any of the pre-tests, type tests or post tests fail, the image is of a type not suitable for backlit scene correction, is not a backlit scene, is not of a known type. Therefore, the image is not suitable for backlit scene correction.

The flow chart of FIG. 19 has both a start 1905 and an end 1995, but the portions of the process may be accomplished in parallel or in serial. Multiple instances of the process may be taking place in parallel or in serial.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for backlit scene detection comprising:
    performing a pre-test on an electronic image, using a computing device including a processor and a memory, to determine that the electronic image does not include a disqualifying characteristic;
    performing a type test on the electronic image, using the computing device, to determine an image type of the electronic image from a first set of predetermined backlit image types;
    performing a post test on the electronic image, using the computing device, to determine that the image darkness density does not exceed a predetermined density; and
    performing a second post test on the electronic image, using the computing device, to determine that the electronic image is one of a second set of predetermined backlit image types or that the edge percentage of the electronic image exceeds a predetermined percentage.

2. The method of claim 1 wherein the presence of a disqualifying characteristic results in a determination that the image is not suitable for backlit correction.

3. The method of claim 2 wherein the disqualifying characteristic is chosen from the set consisting of:
    the electronic image includes a face;
    the electronic image includes fog;
    the electronic image is achromatic;
    the electronic image is too bright;
    the electronic image is too dark; and
    the electronic image includes a sunset.

4. The method of claim 1 wherein the first set of predetermined backlit image types consists of:
    type 1, a primary lower subject significantly darker than an upper bright sky;
    type 2, a single object in a bright sky;
    type 3, a primary subject in high contrast to a bright background;
    type 4, an image with high contrast;
    type 5, an indoor scene including a bright background object;
    type 6, a low-light scene;
    type 7, a scene including two dark objects against a bright background; and
    type 8, a backlit sunset scene.

5. The method of claim 1 wherein the predetermined image darkness density is 0.5 and the image darkness density is calculated by dividing the total number of fields with a block luminance average (BLA) over 127 by the total number of fields with BLA under 50.

6. The method of claim 1 wherein and the predetermined percentage is 0.025 and the second set of predetermined backlit image types is selected from the group consisting of type 2 and type 5.

7. An apparatus, comprising:
    a processor; and
    a memory coupled to the processor, the memory including software that when executed by the processor causes the processor to:
        perform a pre-test on an electronic image to determine that the electronic image does not include a disqualifying characteristic;
        perform a type test on the electronic image to determine an image type of the electronic image from a first set of predetermined backlit image types;
        perform a post test on the electronic image to determine that the image darkness density does not exceed a predetermined density; and
        perform a second post test on the electronic image to determine that the electronic image is one of a second set of predetermined backlit image types or that the edge percentage of the electronic image exceeds a predetermined percentage.

8. The apparatus of claim 7 wherein the presence of a disqualifying characteristic results in a determination that the image is not suitable for backlit correction.

9. The apparatus of claim 8 wherein the disqualifying characteristic is chosen from the set consisting of:
    the electronic image includes a face;
    the electronic image includes fog;
    the electronic image is achromatic;
    the electronic image is too bright;
    the electronic image is too dark; and
    the electronic image includes a sunset.

10. The apparatus of claim 7 wherein the first set of predetermined backlit image types is selected from the group consisting of:
    type 1, a primary lower subject significantly darker than an upper bright sky;
    type 2, a single object in a bright sky;
    type 3, a primary subject in high contrast to a bright background;
    type 4, an image with high contrast;
    type 5, an indoor scene including a bright background object;
    type 6, a low-light scene;
    type 7, a scene including two dark objects against a bright background; and
    type 8, a backlit sunset scene.

11. The apparatus of claim 7 wherein the predetermined density is 0.5 and the image darkness density is calculated by dividing the total number of fields with a block luminance average (BLA) over 127 by the total number of fields with BLA under 50.

12. The apparatus of claim 7 wherein and the predetermined percentage is 0.025 and the second set of predetermined backlit image types is selected from the group consisting of type 2 and type 5.

13. An apparatus comprising a storage medium storing a program having instructions which when executed by a processor will cause the processor to:
perform a pre-test on an electronic image to determine that the electronic image does not include a disqualifying characteristic;
perform a type test on the electronic image to determine an image type of the electronic image from a first set of predetermined backlit image types;
perform a post test on the electronic image to determine that the image darkness density does not exceed a predetermined density; and
perform a second post test on the electronic image to determine that the electronic image is one of a second set of predetermined backlit image types or that the edge percentage of the electronic image exceeds a predetermined percentage.

14. The apparatus of claim 13 wherein the presence of a disqualifying characteristic results in a determination that the image is not suitable for backlit correction.

15. The apparatus of claim 14 wherein the disqualifying characteristic is chosen from the set consisting of:
the electronic image includes a face;
the electronic image includes fog;
the electronic image is achromatic;
the electronic image is too bright;
the electronic image is too dark; and
the electronic image includes a sunset.

16. The apparatus of claim 13 wherein the first set of predetermined backlit image types is selected from the group consisting of:
type 1, a primary lower subject significantly darker than an upper bright sky;
type 2, a single object in a bright sky;
type 3, a primary subject in high contrast to a bright background;
type 4, an image with high contrast;
type 5, an indoor scene including a bright background object;
type 6, a low-light scene;
type 7, a scene including two dark objects against a bright background; and
type 8, a backlit sunset scene.

17. The apparatus of claim 13 wherein the predetermined density is 0.5 and the image darkness density is calculated by dividing the total number of fields with a block luminance average (BLA) over 127 by the total number of fields with BLA under 50.

18. The apparatus of claim 13 wherein and the predetermined percentage is 0.025 and the second set of predetermined backlit image types is selected from the group consisting of type 2 and type 5.

* * * * *